(No Model.) 6 Sheets—Sheet 1.
C. W. THOMAS.
TRANSMITTING MECHANISM FOR MOTOR CARS.
No. 464,640. Patented Dec. 8, 1891.
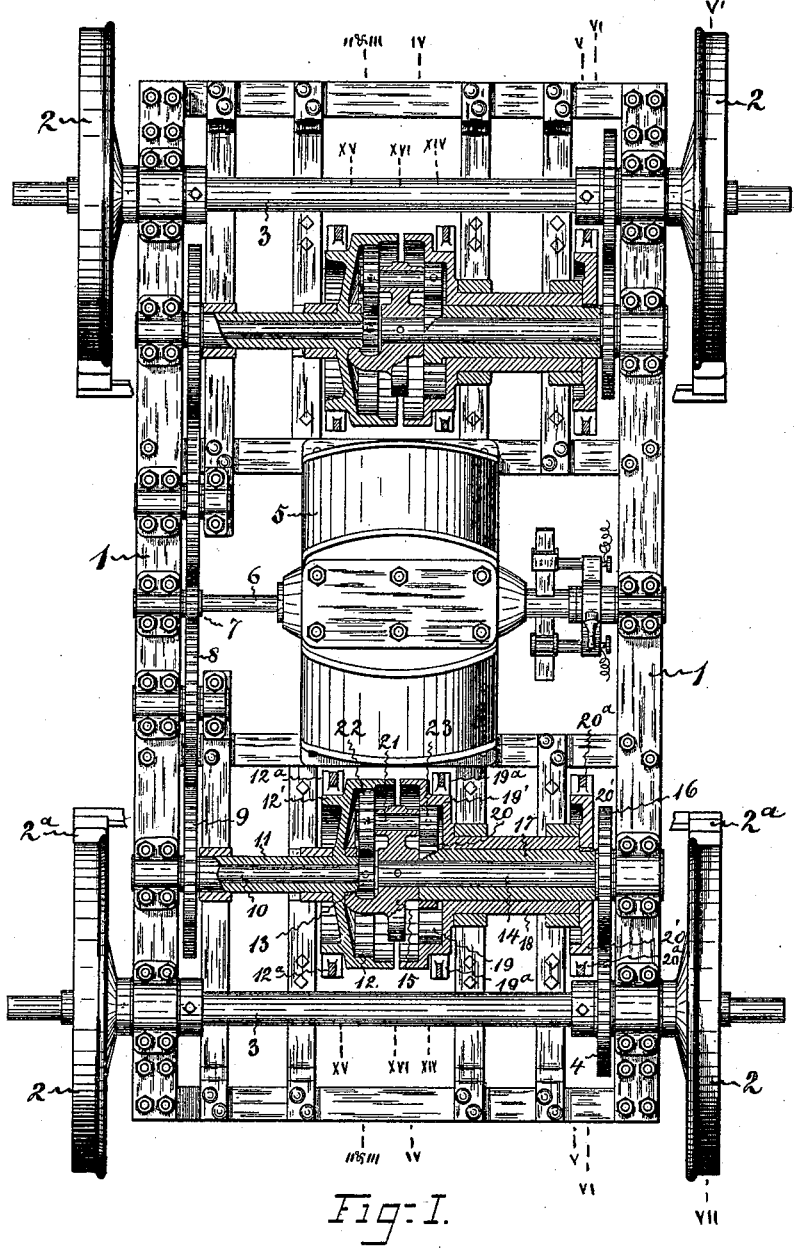
Fig: I.
Witnesses
Frank Guile
Lillie Hanna
Inventor
Chas. W. Thomas
per Knight Bros.
Attorneys

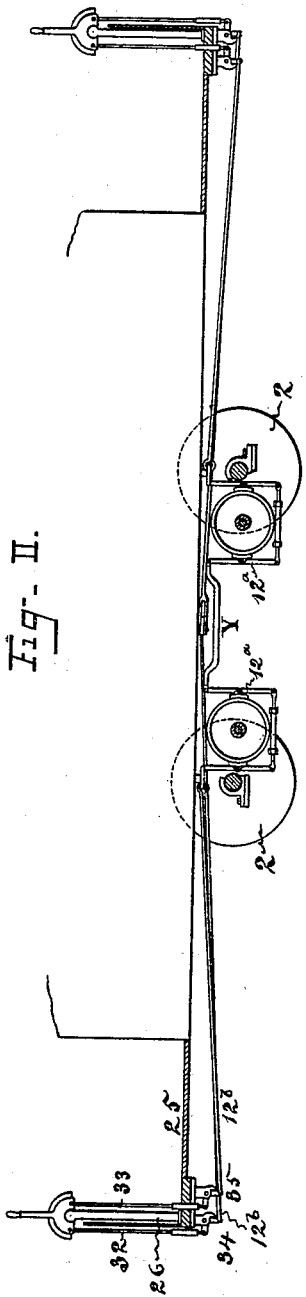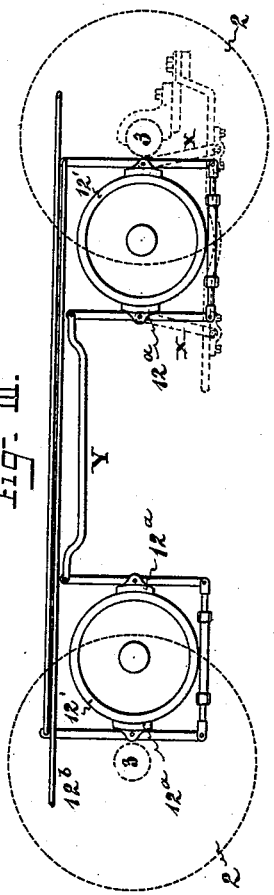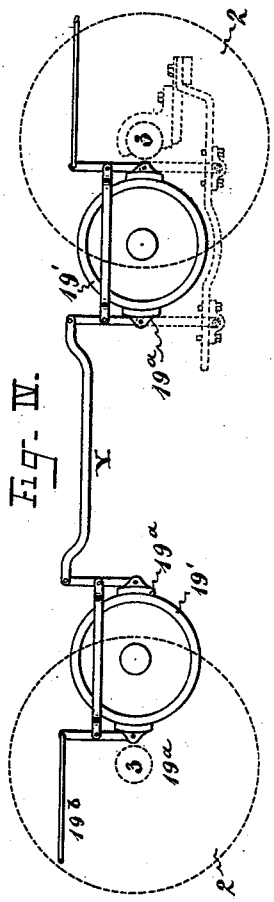

(No Model.) 6 Sheets—Sheet 3.
C. W. THOMAS.
TRANSMITTING MECHANISM FOR MOTOR CARS.
No. 464,640. Patented Dec. 8, 1891.
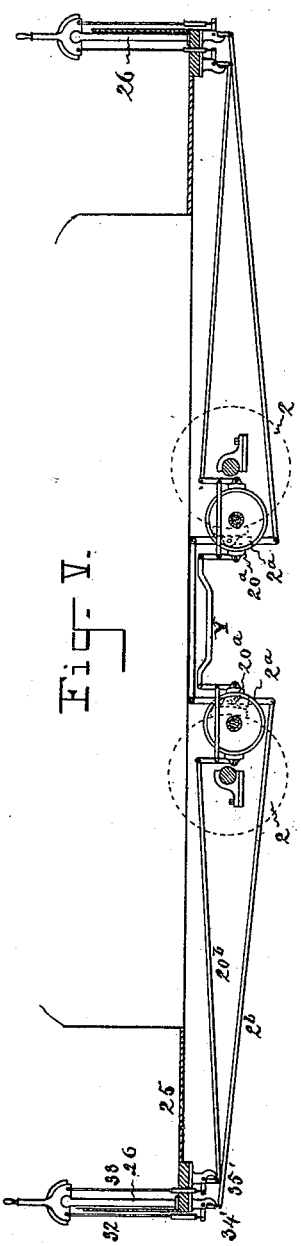
Fig. V.
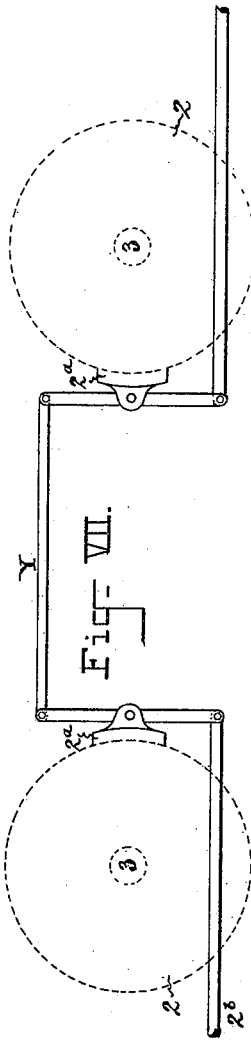
Fig. VII.
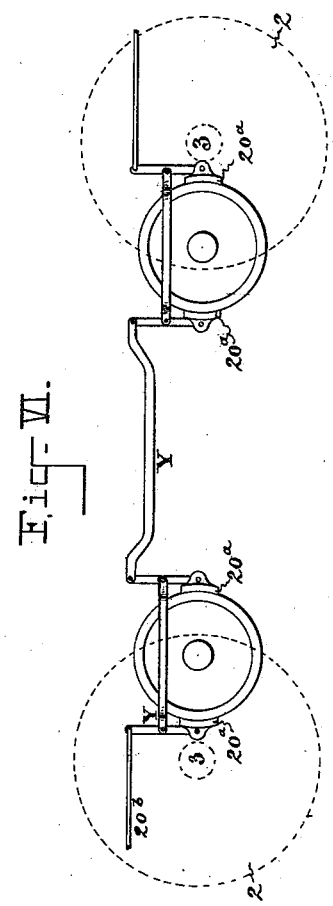
Fig. VI.
Witnesses
Frank Guile
Lillie Hanna
Inventor
Chas. W. Thomas
per Knight Bros.
Atty.

(No Model.) 6 Sheets—Sheet 4.
C. W. THOMAS.
TRANSMITTING MECHANISM FOR MOTOR CARS.
No. 464,640. Patented Dec. 8, 1891.
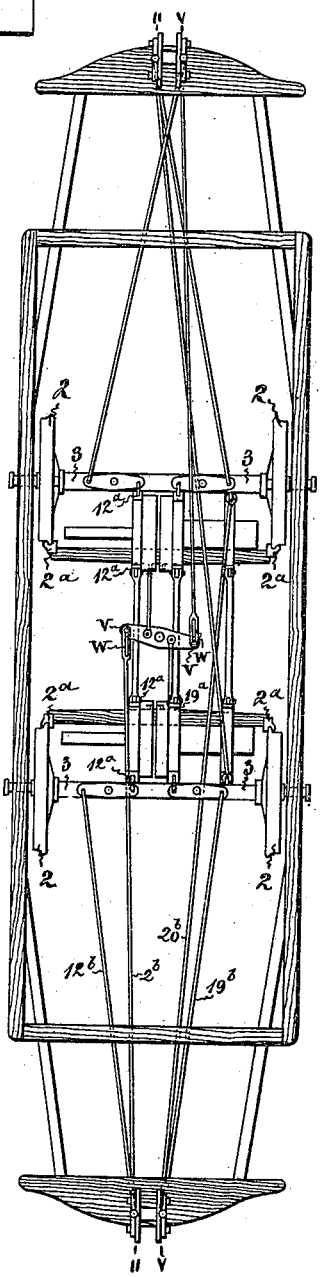
Fig. VIII.
Witnesses
Frank Gule
Lillie Thomas
Inventor
Chas. W. Thomas
By Mughes Bros
Attorneys.

(No Model.) 6 Sheets—Sheet 5.
C. W. THOMAS.
TRANSMITTING MECHANISM FOR MOTOR CARS.
No. 464,640. Patented Dec. 8, 1891.
Fig. IX.
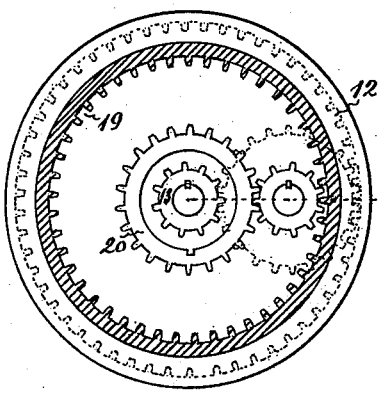
Fig. X.
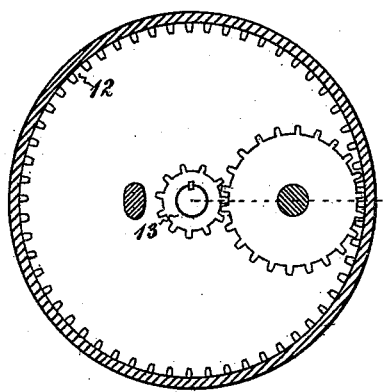
Fig. XI.
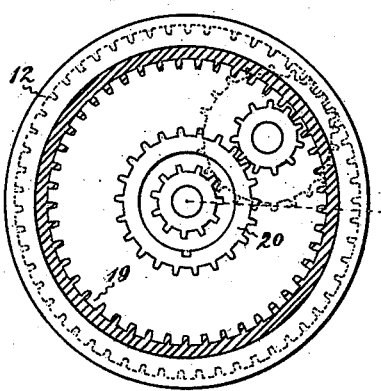
Fig. XII.
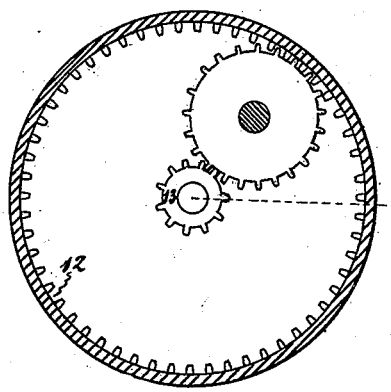
Fig. XIII.
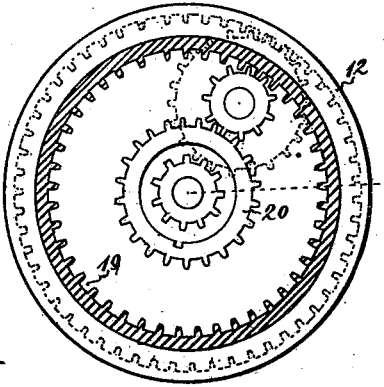
Witnesses
Frank Guile
Lillie Hanna
Inventor
Chas. W. Thomas
per  
Attorneys (No Model.) 6 Sheets—Sheet 6.
C. W. THOMAS.
TRANSMITTING MECHANISM FOR MOTOR CARS.
No. 464,640. Patented Dec. 8, 1891.
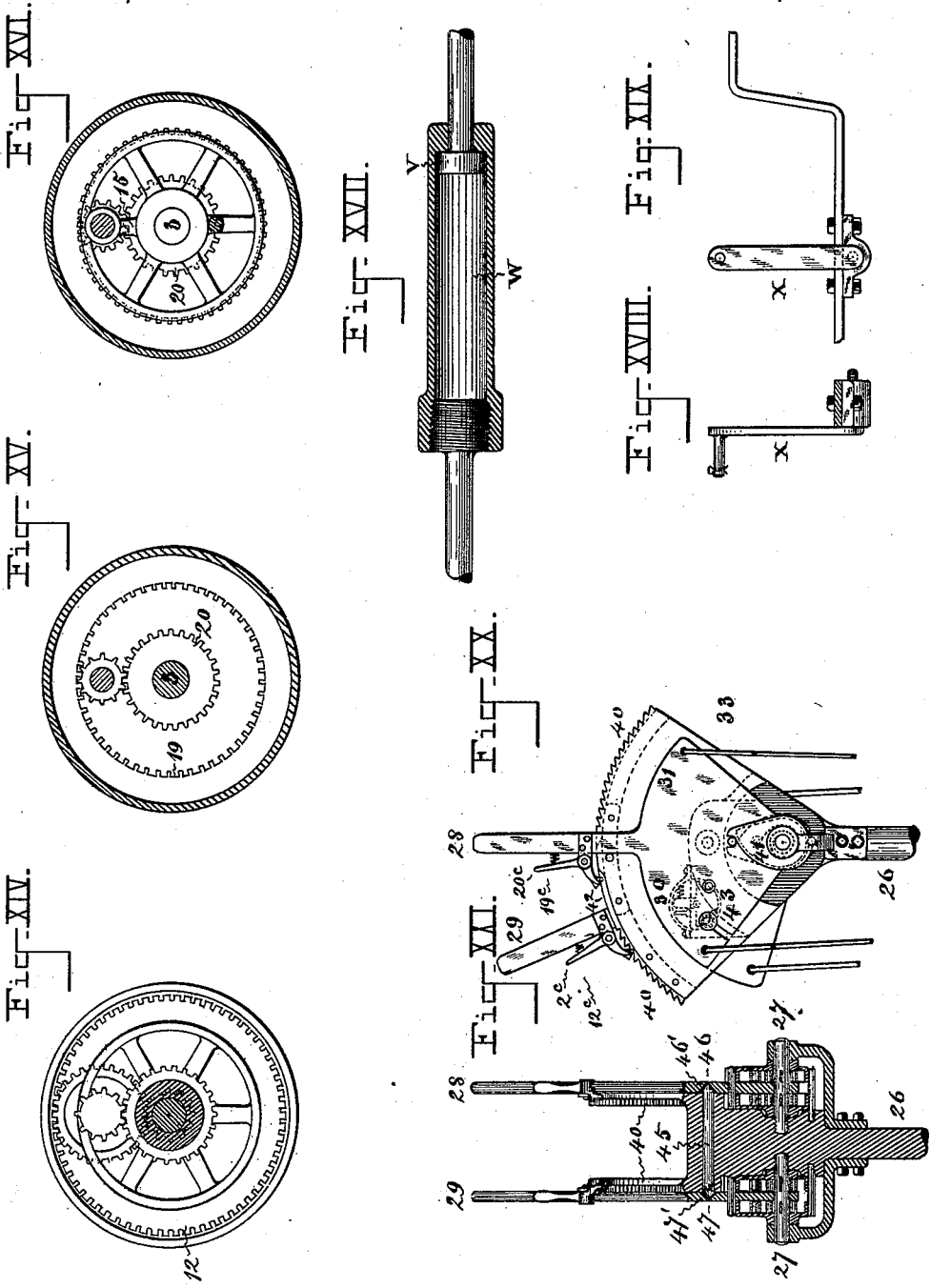
Witnesses
Frank Guile
Lillie Hanna
Inventor
Chas. W. Thomas
per J. Knight & Bro.
Attorneys.

UNITED STATES PATENT OFFICE.

CHARLES W. THOMAS, OF JERSEY CITY, NEW JERSEY, ASSIGNOR OF FIVE-SIXTHS TO PHILIP VAN VOLKENBURGH, OF NEW YORK, AND JOHN H. PENDLETON, OF BROOKLYN, NEW YORK.

TRANSMITTING MECHANISM FOR MOTOR-CARS.

SPECIFICATION forming part of Letters Patent No. 464,640, dated December 8, 1891.

Application filed January 23, 1891. Serial No. 378,836. (No model.)

*To all whom it may concern:*

Be it known that I, CHARLES W. THOMAS, a citizen of the United States, residing in Jersey City, county of Hudson, State of New Jersey, have invented a new and useful Transmitting Mechanism for Motor-Cars, of which the following is a specification.

My said mechanism may be used to transmit the motion of any rotary motor whose speed is habitually greater than that of the shaft or axle to be driven, but has been more especially designed for and is here described in connection with an electric-car motor. The arrangement and operation of the mechanism is such as to permit continuous rotation of the motor-shaft in one direction, whether the car be traveling forward or backward, or be brought to rest. The arrangement is, further, such as, without disturbing the motor or changing its speed or current-supply, to gear largely down for slow or less largely down for more rapid travel without the employment of clutches or the necessity of meshing or unmeshing gearing. The arrangement is also such as to enable the car to be slowed down, stopped, started, or accelerated without sudden shocks to or strain of the machinery.

Referring to the accompanying drawings, which form a part of this specification, Figure I is a plan of an electric car equipped with my transmitting mechanism, said mechanism being shown in axial section. Figs. II to VII, inclusive, are fore and aft sections on the lines II II, III III, IV IV, V V, VI VI, and VII VII, respectively. Fig. VIII is a plan view of the brake mechanism. Fig. IX is a section on line IX IX, showing the mechanism transmitting a fast forward motion. Fig. X is a section on line X X, showing the mechanism transmitting a slow forward motion. Fig. XI represents the fast and Fig. XII the slow transmission, respectively, each after one revolution of the motor-shaft. Fig. XIII illustrates the same mechanism in the act of imparting a retrograde motion to the track-wheels. Figs. XIV to XVI, inclusive, are sections on the lines XIV XIV, XV XV, and XVI XVI, respectively. Fig. XVII is a longitudinal section of a telescope-joint of brake-rod. Fig. XVIII is a front and Fig. XIX is a side elevation of a portion of the bearing-strap and one of the rocking supports of the brake mechanism. Fig. XX is a side view, and Fig. XXI is a section on line XXI XXI, of my brake-operating handles.

1 may represent the bed or frame of an electric-car truck.

2 represents track-wheels keyed or otherwise rigidly fastened to axles 3. Rigidly fastened to each axle is a cog-wheel 4.

5 represents an electric motor and 6 its armature-shaft, which carries a pinion 7. Rotation is communicated from the said pinion 7 to both axles by two trains of transmitting mechanism, whose construction being identical a description of one will suffice for both. The pinion 7 gears through one or more intermediate wheels 8 to a wheel 9 on a shaft 10, whose outer end is journaled in a bearing on the truck-frame, and whose inner portion revolves within a sleeve 11, which is journaled to one of the interior truck-timbers and carries at its inner end a female cog-wheel or annular rack 12. The shaft 10 carries at its inner extremity a pinion 13.

Journaled to the truck-frame in alignment with shaft 10 is the independently-revolving shaft 14, to whose inner extremity is attached an arm 15. The shaft 14 carries near its outer end a wheel 16, which meshing in the wheel 4 upon the axle, it follows that rotation of wheel 16 is accompanied by a like but opposite rotation of wheel 4, and consequently of axle 3 and its attached truck-wheels 2. The portion of shaft 14 between wheel 16 and arm 15 is journaled within a sleeve 17, that itself is inclosed by and revolves within a still larger sleeve 18, which latter is journaled in the truck-frame. The sleeve 18 carries at its inner end a female cog-wheel or annular rack 19 of less diameter than the annular rack 12. Encircling and rigidly attached to the inner extremity of sleeve 17 is a male annular rack 20, whose pitch circle is of greater diameter than that of the pinion 13. Journaled in the arm 15 is a short shaft 21, which carries at its two extremities two pinions 22 23 of diverse diameters. These two pinions therefore rotate in unison, the same as if forged or cast in one integral piece, with said shaft 21 at the same angular but, owing to their unequal diameters, at different circumferential velocities. Of these pinions the pinion 22 meshes permanently in pinion 13 and in the annular rack 12, while the pinion 23 in like manner meshes permanently in the male and female annular racks 20 and 19. Integral with each of these annular racks or rigidly attached to it is a friction-drum—that is to say, integral with the racks 12 and 19, respectively, are friction-drums 12' and 19', and keyed fast to the sleeve-extension 17 of the rack 20 is a friction-drum 20'.

Suitably hung from the truck-frame are brake shoes or rubbers, of which shoes $2^a$ are adapted to be pressed against the track-wheels. Shoes $12^a$ press against the drum 12', shoes $19^a$ against the drum 19', and shoes $20^a$ against the drum 20'.

As usual in such apparatus, all the brake-shoes are so supported—say as shown at X—as to hang normally just out of contact with their respective friction-drums, and the pairs of shoes are coupled—say as shown at Y or in any other customary or suitable way—so as when brought into action to simultaneously bind upon the cylindrical periphery with which they are adapted to operate, and so they can be brought into action by the brake-handles at either end of the car, the handle mechanism at the other end then operating merely as a holdfast, such provision being here shown, but, being similar in principle to such devices in general use, requires no minute description.

$v$ shows the pin and $w$ the slide of a telescope-joint, which enables the operating-rod that passes to one end of the car to remain slack while tension is being applied to the corresponding rod that extends to the other end of the car.

Either of the above-described sets of brake mechanisms can be operated from either car-platform by means which, being the same on each platform, a description of one will apply to both.

Firmly secured to the platform 25 is a standard 26, which has fulcrums 27 for two levers or vibrating-handles 28 29, whose oscillation about said fulcrums is longitudinal of the car. Each lever has two wings 30 31, which extend one forward and the other rearward, connected by rods 32 33 with the horizontal limbs of bell-cranks 34 35 34' 35'. From bell-crank 34 a rod $12^b$ extends to the rubbers $12^a$, which, when drawn together by the application of tension upon said rod, arrests the rotation of rack 12 and so transmits the motion of the motor as to produce a slow but powerful rotation of the track-wheels; or, the rack 12 being set free, either of the other racks 19 or 20 may be stopped by tension on the appropriate rod $19^b$ or $20^b$, in one case transmitting a comparatively rapid propulsion forward of the track-wheels and in the other case reversing the rotation, so as to cause a retrograde rotation of the track-wheels. Finally, all the racks being left free to rotate, operates, for the time being, to disconnect the motor from the running-gear. In this inert condition of the transmitting mechanism the car of course comes to a standstill as soon as the acquired *vis viva* of the vehicle has been suppressed by the friction of the parts. Such stoppage may, however, be greatly expedited, when desired, by subjecting the rod $2^b$ to tension, so as to press the shoes $2^a$ against the peripheries of the track-wheels.

In order to retain the operating-handle 28 or 29 to the effective position, I provide four arcuate racks 40, of which three are shown—one rack for each brake system—and as many spring-catch pawls $12^c$, $19^c$, $20^c$, and $2^c$. Pressure of the key of the engaged spring-pawl against the lever enables the spring-retractor 41 to restore the lever to its vertical and inactive position.

Plateaus 42 between the racks permit momentary or slight tension action on either brake system without engagement of the spring-catch pawl or need to manipulate said pawl.

Inasmuch as when the brakeman is at one end of the car the brake-operating apparatus at the other end will be not in use, a lock 43 is provided, which makes it impossible for the-time-being-unused end to be tampered with by unauthorized persons.

45 is a sliding guard-check, one or other of whose conical ends 46 47, by entering a socket 46' 47' in the lever, causes one lever, when brought into operation, to automatically lock the other lever, and thus to make it impossible for a careless driver to turn two different rates of transmission on at the same time.

The geared connection 7 8 9 is only for the purpose of slowing down the necessarily very high speed of the armature-shaft; but it is evident that if no such great change of speed is needed the shaft 10 might be the motor-shaft itself and the intermediate gearing 7 8 9 be dispensed with. For some uses a still further simplification might be secured by mounting the driven wheel 2 directly upon the shaft 14, so as to dispense with the gearing 4 16.

The operation is as follows: The shaft 10 is kept constantly in rotation by the motor 5 through the armature-shaft 6 and the pinions 7, 8, and 9. When the car is at a standstill, the brakes $2^a$ are applied to the back wheels to prevent them turning, which prevents the pinion 16, shaft 14, and arm 15 from rotating, and allows the power to be expended through the shaft 10, pinion 13, pinion 22, rack 12, shaft 21, pinion 23, rack 19, sleeve 18, rack 20, and sleeve 17. When it is desired to start the car, the brakes $2^a$ are removed from the track-wheels and the brake-shoes $19^a$ applied to the friction-drum 19', which allows the car to move slowly, the power being transferred through the shaft 10, pinion 13, pinion 22, shaft 21, pinion 23, rack 19, (which is being held stationary,) arm 15, shaft 14, and pinions 16 and 4 to the axle 3. When it is desired to increase the speed, the brake-shoes 19$^a$ are removed from the friction-drum 19' and the brake-shoes 12$^a$ are applied to the friction-drum 12', when the power will be transferred through the shaft 10, pinion 13, pinion 22, rack 12, (which is held stationary,) shaft 21, arm 15, shaft 14, and pinions 16 and 4. When it is desired to back the car, it is first slowed up and then the brake-shoes 20$^a$ are applied to the friction-drum 20', which is rigidly secured on the sleeve 17, which carries the rack 20, the power being transferred through the shaft 10, pinion 13, pinion 22, shaft 21, pinion 23, rack 20, (which is held stationary,) arm 15, shaft 14, and pinions 16 and 4, (in the reverse direction.) By this arrangement the speed and direction of the car can be economically controlled without changing the speed or direction of the motor.

Having thus described my invention, the following is what I claim as new therein and desire to secure by Letters Patent:

1. The combination, with a motor, of the fast and loose transmitting mechanism having the annular racks 12, 19, and 20, of diverse diameters, which, together with driving-shaft 10, having pinion 13, and with driven shaft 14, having an arm 15, all revolve independently about a common axis, a shaft 21, journaled in said arm, differential pinions 22 23 on said shaft, of which one pinion meshes in pinion 13 and the annular rack 12 and the other meshes in the annular racks 19 and 20, a friction-drum integral with each of said racks and three independently-operated brake systems, one for each rack-drum, by which the operator is enabled to disconnect the driving and driven portions or to produce a fast or slow forward or a retrograde rotation of the said driven portion, as set forth.

2. The combination, with the track-wheels and with the transmitting mechanism of a motor-car, of the four systems of optionally-applied normally-inactive brakes, whereby the car can be started at the desired speed or be brought to rest in the manner explained.

3. In combination, with the four systems of brakes, the four arcuate racks 40, separated by plateaus 42, and the two double-acting brake-levers 28 29, having the spring-catches 2$^c$, 12$^c$, 19$^c$, and 20$^c$.

4. The combination, with the two double-acting levers 28 29, of the double-acting guard-check 45, for the purpose set forth.

CHAS. W. THOMAS.

Witnesses:
LILLIE HANNA,
FRANK GUILE.